3,004,012
CATALYTIC PROCESS FOR POLYMERIZING CHLOROPRENE TO A SOLID ELASTOMER
Harold Leonard Jackson and Kurt Lothar Seligman, Wilmington, Del., assignors to E. I. du Pont de Nemours and Company, Wilmington, Del., a corporation of Delaware
No Drawing. Filed Feb. 5, 1958, Ser. No. 713,315
5 Claims. (Cl. 260—92.3)

This invention relates to the preparation of polychloroprene and to a new method of polymerizing chloroprene to solid synthetic elastomers of high molecular weight having improved and desirable properties.

The formation of rubber-like polymers from such conjugated diene compounds as butadiene, isoprene, dimethyl butadiene and the like has been accomplished employing a polymerizing agent and selected solvents. Generally, sodium is preferred as a polymerizing agent or catalyst. Numerous modifications of the use of alkali and alkaline earth metals as polymerization catalysts have been disclosed but such disclosures are usually general in nature and teach the use of these catalysts to polymerize dienic hydrocarbons with emphasis on the use of alkali metals.

The polymerization of chloro-2-butadiene-1,3, chloroprene to solid, elastomeric products presents a different problem from the polymerization of diene hydrocarbons and, generally, many catalysts, such as sodium, that are suitable for one are not suitable for the other. Chloroprene is generally polymerized in aqueous emulsions, in which systems satisfactorily rapid polymerization may be obtained. Polymerization in non-aqueous systems has received relatively little attention. The chief difficulty in utilizing non-aqueous systems for polymerizing chloroprene is the slowness of polymerization, and to date suitable catalysts for polymerizing chloroprene to useful solid elastomeric products in such systems have not been discovered.

Polymerization of chloroprene in non-aqueous systems clearly indicates that conventional catalysts such as sodium or potassium used in diene polymerization, are not suitable in such polymerizations; in fact, those conventional catalysts cited above do not effectively act as catalysts. Effectively catalyzing the polymerization of chloroprene in non-aqueous systems has been found to be specific to lithium.

The problem of improving the properties of polychloroprene at low temperatures has been an outstanding one ever since polychloroprene was first prepared. Although all elastomers become hard and lose their elastic properties at extremely low temperatures, polychloroprene, as now commercialized, becomes hard and loses its elastic properties at a higher temperature than do other elastomers in general. Efforts to overcome the above serious disadvantages of polychloroprene include reaction mixtures leading to the interpolymerization of relatively small amounts of certain other polymerizable compounds with chloroprene. This approach to the problem suffers from the disadvantages of increasing the cost of the raw materials and complicating the manufacturing procedure.

It is an object of the present invention to effect polymerization of chloroprene in non-aqueous systems at accelerated rates.

It is another object of the present invention to effect polymerization of chloroprene using metallic lithium.

It is still another object of the present invention to prepare solid elastomeric chloroprene which retains elastomeric properties at low temperatures for extended periods of time.

It is an additional object of the present invention to produce polychloroprene elastomers of high molecular weight which possess marked freeze resistance using a reaction mixture containing a single polymerizable monomer.

The above objects are accomplished in accordance with our invention by subjecting substantially anhydrous liquid chloroprene to the action of metallic lithium with or without a nonreacting saturated hydrocarbon solvent.

The polymerization must be carried out in the absence of oxygen, nitrogen or their compounds. Thus, if the polymerization is carried out in a solvent, the latter must contain no alcohol, acid, ketones, amines, etc., as well as being anhydrous and free from dissolved air and carbon dioxide. If a gas phase is present during the polymerization, it must similarly be free of water, nitrogen, oxygen and the like and preferably an inert gas such as helium or argon is employed.

The preparation of polychloroprene in accordance with our invention is thus conveniently carried out in a suitable pressure container enabling the reaction mixture to be strictly controlled out of contact with interfering foreign substances. The pressure container further serves to maintain autogenous pressure. Alternatively, the invention may be carried out by passing a suspension of the lithium catalyst in the chloroprene or in its solution in the inert solvent continuously through a reactor maintained at the desired temperature under a pressure which will prevent the formation of any vapor phase.

Although polymerization may be carried out within a temperature range of 0° to 100° C., it is preferred to maintain the temperature between 30° to 70° C., the rate of polymerization increasing with an increase of temperature within the preferred range. Similarly, the degree of polymerization is also affected by the reaction time. In general, the longer the reaction time the larger will be the degree of polymerization and percent of chloroprene polymerized to solid elastomers.

Metallic lithium may be employed in the form of shot or chunks or in the form of a dispersion in mineral oil. Lithium shot of about 1 to 2 mm. is suitable, providing ample surface exposure for relatively rapid polymerization. Finely dispersed lithium, having an average diameter between 10 and 20 microns, provides more exposed surface and appears to increase the rate of polymerization. It also has the advantage of not requiring agitation to maintain good contact between the catalyst and the chloroprene. An amount of lithium of 0.1 to 1% by weight of the chloroprene in the reaction mixture is preferred within the operative range of 0.05 to 5% and metallic lithium in the form of shot, dispersions and the like at the latter concentration gives sufficient surface exposure to effectively catalyze the polymerization.

When shot or chunks of metallic lithium are used, the reaction mixture should be agitated. Stainless steel balls within the pressure vessel in contact with the polymerization mixture have been found suitable for promoting some degree of comminution of the catalyst during polymerization. The reaction mixture can be additionally agitated by means of a shaking machine.

Decreasing the concentration of lithium within the above-defined limits increases the molecular weight of the elastomers produced. Increasing the concentration of lithium beyond 1% by weight of the chloroprene in the reaction mixture results in decreasing the molecular weight of the elastomer, although up to 5% by weight of lithium will still promote the formation of solid chloroprene elastomers. The range of 0.1 to 1% by weight of lithium concentration is the preferred one to effect a rapid polymerization of chloroprene to solid elastomers which possess superior freeze resistance.

As previously stated, chloroprene alone can be polymerized in an inert atmosphere in contact with metallic lithium. However, a reaction mixture containing a nonreactive hydrocarbon solvent is usually preferred. The term "nonreactive solvent" includes those solvents that do not interpolymerize with chloroprene, react with lithium, or otherwise participate irreversibly in the reaction. Cyclohexane is well suited as a solvent as are many other saturated, readily distillable liquid hydrocarbons such as paraffin hydrocarbons, petroleum fractions and the like which do not contain oxygen or nitrogen.

A ratio of solvent to chloroprene of 1:1 is satisfactory, although higher or lower ratios may be used to advantage when results are desired which either approach those obtained in the absence of solvent or are removed from such results. The amounts of solvent to be employed with a certain amount of chloroprene may readily be determined by one skilled in the art, depending on the elastomer desired.

Generally, if little or no solvent is included in the reaction mixture, polychloroprene elastomers of higher molecular weight are produced than if the ratio of solvent to chloroprene is 1:1 or more. Frequently, polychloroprene elastomers of high molecular weights are desirable. On the other hand, it may be preferred to prepare solid chloroprene elastomers of lower molecular weight and the addition of solvent to the reaction mixture provides a means of accomplishing that end.

Polymers produced according to the present invention may be cured to products that possess improved freeze resistance. When removed from the reaction container, metallic lithium catalyst residues may be removed by centrifuging if the reaction mixture is sufficiently fluid. The addition of anhydrous thiophene-free benzene will serve to permit centrifuging if the mixture is viscous. The addition of ethanol or isopropanol will serve to destroy the lithium catalyst in the event the mixture is extremely viscous. However, centrifugation or other physical means of catalyst separation is preferred to the chemical destruction of lithium since the latter step imparts a higher ash content to the polymer.

If solvent is present in the reaction mixture, it may be removed under vacuum subsequent to the destruction and removal of the lithium catalyst. Alternatively, the polymer may be precipitated by the addition of alcohol and thereafter removed and dried by milling.

The use of lithium as a polymerization agent or catalyst effects the polymerization of chloroprene in a relatively short period of time. The use of other alkali metals as catalysts is not recommended since these metals have little effect in polymerizing chloroprene. Indeed, as a practical matter, the polymerization of chloroprene without any catalyst at all proceeds as rapidly as those reaction mixtures which use sodium or potassium as a catalyst as indicated by experiments. Lithium, however, is a remarkably effective catalyst for the polymerization of chloroprene under the conditions as outlined herein.

The process is suitable for continuous operation. For example, the chloroprene, solvent, and dispersed or suspended lithium may be continuously passed through a heated tube to produce the desired amount of polymerization and then, after removal of the catalyst, the solvent and unchanged chloroprene may be continuously evaporated from the polymer and recirculated to the polymerizing tube, after replacing the chloroprene which has been used up.

The following examples illustrate various polymerizations which were carried out in stainless steel pressure bombs, in the absence of oxygen, moisture, carbon dioxide and nitrogen. The pressure bombs were dried by heating while applying vacuum and by subsequently flushing with nitrogen. Preparatory to charging, the bombs were thoroughly flushed with helium which was dried by passage through a mixture of dry asbestos and phosphorus pentoxide.

Into a bomb was placed chloroprene (containing less than 0.01% water) and the solvent (cyclohexane, 99% pure, dried by passage through a 35 inch silica gel column) while maintaining a steady flow of helium over the mouth of the bomb. The metal catalyst was added by syringe, in the case of a mineral oil dispersion, or directly in the case of shot or chunks of lithium. When shot or chunks of lithium were used, stainless steel balls were placed into the bomb in order to obtain some degree of comminution during the polymerization. The bomb was closed and placed into a heated shaking machine. Polymerization was allowed to proceed at the indicated temperature for definite time periods.

Under most conditions the product solution was sufficiently fluid to permit separation of lithium catalyst residues by centrifuging for 30 minutes at 1900 r.p.m. After decantation of the supernatant liquid and addition of an antioxidant ($\beta$-phenyl-naphthylamine), the solvent was removed from the product under vacuum.

The lithium dispersions were made by high-speed agitating at about 190° C., with strict exclusion of water and oxygen, a light hydrocarbon lubricating oil and the molten lithium. On cooling, the finely dispersed lithium crystallized, giving particles with an average diameter between 10 and 20 microns. The lithium shot was about 1 to 2 mm. in diameter.

EXAMPLE 1

Chloroprene was polymerized using 0.5 by weight of lithium shot (based on the weight of chloroprene in the reaction mixture). An amount of cyclohexane equal in volume to the chloroprene was added. The temperature was kept at 65° C. for 16 hours. The yield was 23% of a plastic polymer with an intrinsic viscosity [$\eta$] determined in benzene at 30° C., of 1.44.

One hundred parts of this polymer was compounded with four parts of magnesium oxide, five parts of zinc oxide and 0.35 part of ethylene thiourea and cured for 30 min. at 140° C., giving a vulcanizate with a modulus at 600% elongation of 1280 p.s.i., a tensile strength of 3680 p.s.i., and an elongation of 910% at break.

EXAMPLE 2

Chloroprene was polymerized as indicated above with several variations. The temperature was 50° C. and 0.75% of lithium was added in the form of a 25% fine dispersion in lubricating oil. The yield in 16 hours was 18% of polymer, isolated by precipitation with alcohol. When compounded and cured as in Example 1, it showed a modulus at 600% elongation of 850 p.s.i., a tensile strength of 1000 p.s.i., and an elongation at break of only 650%. The resilience (Yerzley method), however, was 85 and the hardness (Shore method) of sample kept at −20° C. increased only from 48 to 57 in one day and remained at this value for 14 days, indicating remarkable freeze resistance. In comparison, a typical polychloroprene prepared in aqueous emulsion by means of a free-radical catalyst and in the presence of an aliphatic mercaptan had a modulus at 600% elongation of 1280 p.s.i. and a tensile strength of 2400 p.s.i., with an elongation at break of 720%. The resilience was 77. Stored at −20° C. the original hardness of 45 increased to 80 in one day and in 3 days reached 95, near the upper limit of the testing instrument.

The effect of catalyst concentration on the process of the present invention is shown by Examples 3, 4 and 5. A decrease in catalyst concentration within the limits employed does not result in a marked lowering of the conversion, but increases the molecular weight as indicated by intrinsic viscosity determinations [$\eta$].

The polymerizations outlined in Table I were carried out at 50° C. over a period of 16 hours in cyclohexane as the solvent (1:1 ratio).

Table I

| Ex. | Percent of lithium per 100 parts of monomer | Percent Conversion | $[\eta]$ |
|---|---|---|---|
| 3 | 0.50 | 13.0 | 1.19 |
| 4 | 0.25 | 10.5 | 1.33 |
| 5 | 0.14 | 12.6 | 1.51 |

Table II outlines the effect of temperature and time cycle upon the solution polymerization using a solvent, cyclohexane, in a 1:1 ratio of chloroprene and catalyzed with 0.5 part of lithium shot in the instance of Examples 6 and 7. The major effect of temperature variation upon the lithium catalyzed polymerization of chloroprene is a decrease in intrinsic viscosity $[\eta]$ with decreasing temperature of polymerization. Shortening the time cycle appreciably decreases the yield of product and lowers the intrinsic viscosity.

Table II

TEMPERATURE AND TIME

| Ex. | Temp., °C. | Time, Hrs. | Percent Conversion | $[\eta]$ |
|---|---|---|---|---|
| 1 | 65 | 16 | 23.0 | 1.44 |
| 3 | 50 | 16 | 13.0 | 1.19 |
| 6 | 35 | 16 | 17.0 | 0.82 |
| 7 | 50 | 8 | 11.2 | 0.59 |

In the absence of solvent, the polymerization goes faster, giving higher yields of higher solution viscosity and molecular weight. This is illustrated in Example 8.

EXAMPLE 8

Chloroprene was polymerized as in Example 2 except that no solvent and only 0.38% of finely dispersed lithium was used. In only 2 hours at 65° C., a 20% yield of a rather tough polymer of high solution viscosity was formed. In 16 hours, the yield was 65%. Without catalyst, in 16 hours there was formed only 12.5% of a much softer polymer.

Illustrating the highly specific catalyzing action of lithium in non-aqueous systems of chloroprene as compared with the action of sodium and potassium, the following table will serve to demonstrate that these two alkali metals cannot be considered catalysts as a practical matter. A control polymerization without any alkali metal present is included for comparison.

Table III

COMPARISON OF ALKALI METALS

| Catalyst | Parts of catalyst per 100 of monomer | Type and ratio of solvent | Temp., °C. | Time, Hrs. | Percent Conversion |
|---|---|---|---|---|---|
| Na | 0.5 | 1-1 cyclohexane. | 50 | 16 | 4.8 |
| K | 0.5 | do | 50 | 16 | 3.9 |
| Li | 0.5 | do | 50 | 16 | 13.0 |
| | | do | 50 | 16 | 2.5 |

The experiment with lithium is that noted in Example 3. The other alkali metals were employed under identical conditions except as noted in the above data.

The embodiments of the invention in which an exclusive property or privilege is claimed are defined as follows:

1. A process for homopolymerizing chloroprene to a solid homopolymeric chloroprene elastomer wherein metallic lithium as the sole catalyst is contacted in a non-reactive non-aqueous system and in an inert atmosphere with a liquid substantially anhydrous chloroprene at a temperature within the range of 0° to 100° C., said lithium being present in an amount within the range of 0.05 to 5% by weight of said chloroprene.

2. The process of claim 1 wherein said lithium is present in an amount within the range of 0.1 to 1% by weight of said chloroprene, and, said temperature is within the range of 30° to 70° C.

3. A process for homopolymerizing chloroprene to a solid homopolymeric chloroprene elastomer wherein metallic lithium as the sole catalyst is contacted in a non-reactive non-aqueous system and in an inert atmosphere with a liquid substantially anhydrous chloroprene at a temperature within the range of 0° to 100° C., in the presence of a non-reactive hydrocarbon solvent, said lithium being present in an amount within the range of 0.05 to 5% by weight of said chloroprene.

4. The process of claim 3 wherein the ratio of said solvent to said chloroprene is 1:1.

5. The process of claim 3 wherein said lithium is present in an amount within the range of 0.1 to 1% by weight of said chloroprene, and, said temperature is within the range of 30° to 70° C.

References Cited in the file of this patent

UNITED STATES PATENTS

| 1,058,056 | Harries | Apr. 8, 1913 |
| 1,073,116 | Harries | Sept. 16, 1913 |
| 2,665,197 | Rowland | Jan. 5, 1954 |

FOREIGN PATENTS

| 545,193 | Great Britain | May 14, 1942 |

OTHER REFERENCES

"The Neoprenes," Catton, pp. 1-2 (1953), E. I. du Pont de Nemours & Co., Inc., Wilmington, Del.